(12) United States Patent
Rousseau

(10) Patent No.: US 11,140,376 B2
(45) Date of Patent: Oct. 5, 2021

(54) METHOD FOR CALIBRATING A BINOCULAR DISPLAYING DEVICE

(71) Applicant: Essilor International, Charenton-le-Pont (FR)

(72) Inventor: Denis Rousseau, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/569,098

(22) PCT Filed: Jun. 14, 2016

(86) PCT No.: PCT/EP2016/063550
§ 371 (c)(1),
(2) Date: Oct. 25, 2017

(87) PCT Pub. No.: WO2016/202762
PCT Pub. Date: Dec. 22, 2016

(65) Prior Publication Data
US 2018/0124375 A1    May 3, 2018

(30) Foreign Application Priority Data

Jun. 15, 2015    (EP) .................................. 15305923

(51) Int. Cl.
*H04N 13/144* (2018.01)
*G02B 27/01* (2006.01)
(Continued)

(52) U.S. Cl.
CPC ......... *H04N 13/144* (2018.05); *G02B 27/017* (2013.01); *G02B 27/0189* (2013.01);
(Continued)

(58) Field of Classification Search
None
See application file for complete search history.

(56) References Cited

U.S. PATENT DOCUMENTS

| 6,753,828 B2 | 6/2004 | Tuceryan et al. |
| 2006/0152434 A1 | 7/2006 | Sauer et al. |

(Continued)

OTHER PUBLICATIONS

Livingston, M., et al., Vertical Vergence Calibration for Augmented Reality Displays, Proceedings of the IEEE Virtual Reality Conference 2006, Mar. 25-29, Alexandria, VA, pp. 293-294 (Year: 2006).*

(Continued)

*Primary Examiner* — Lindsay J Uhl
(74) *Attorney, Agent, or Firm* — Oblon, McClelland, Maier & Neustadt, L.L.P.

(57) ABSTRACT

A calibrating method for calibrating the position of pictures on display elements of a binocular displaying device, the binocular displaying device comprising a right display element and a left display element to display right and left pictures. The method comprising a virtual markers displaying step, during which a right virtual marker and a left virtual marker are displayed respectively from the right display element and the left display element when the wearer uses the binocular displaying device, the right and left virtual markers being at least visually vertically alignable with a real world target at an alignment condition, and an aligning step, during which each of the right and left virtual markers are aligned with the real world target.

12 Claims, 2 Drawing Sheets

Figure 3A:
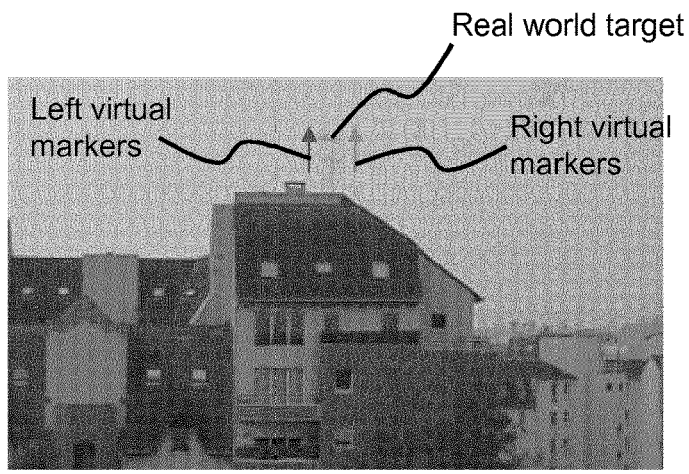

(51) Int. Cl.
*H04N 13/344* (2018.01)
*H04N 13/398* (2018.01)
*G02B 7/12* (2021.01)

(52) U.S. Cl.
CPC ......... *H04N 13/344* (2018.05); *H04N 13/398* (2018.05); *G02B 7/12* (2013.01); *G02B 2027/0134* (2013.01); *G02B 2027/0141* (2013.01); *H04N 2213/002* (2013.01)

(56) References Cited

U.S. PATENT DOCUMENTS

| | | | | |
|---|---|---|---|---|
| 2014/0333665 | A1* | 11/2014 | Sylvan | G06F 3/013 345/633 |
| 2015/0215611 | A1* | 7/2015 | Wu | H04N 13/275 345/419 |
| 2016/0012643 | A1* | 1/2016 | Kezele | G02B 27/0093 345/633 |
| 2016/0349510 | A1* | 12/2016 | Miller | G02B 27/0172 |
| 2016/0353093 | A1* | 12/2016 | Lyon | G02B 27/017 |

OTHER PUBLICATIONS

International Search Report and Written Opinion dated Oct. 5, 2016, in PCT/EP2016/063550, filed Jun. 14, 2016.
Office Action dated Aug. 2, 2019 in corresponding Chinese Patent Application No. 201680024934.6 with English Translation.
Mark A. Livingston et al., "Vertical Vergence Calibration for Augmented Reality Displays", Proceedings of the IEEE Virtual Reality Conference, p. 293-294, Mar. 2006.
Jannick P. Rolland et al., "Towards quantifying depth and size perception in virtual environments", PRESENCE, vol. 4 Issue 1, p. 24-29, Dec. 1995.

* cited by examiner

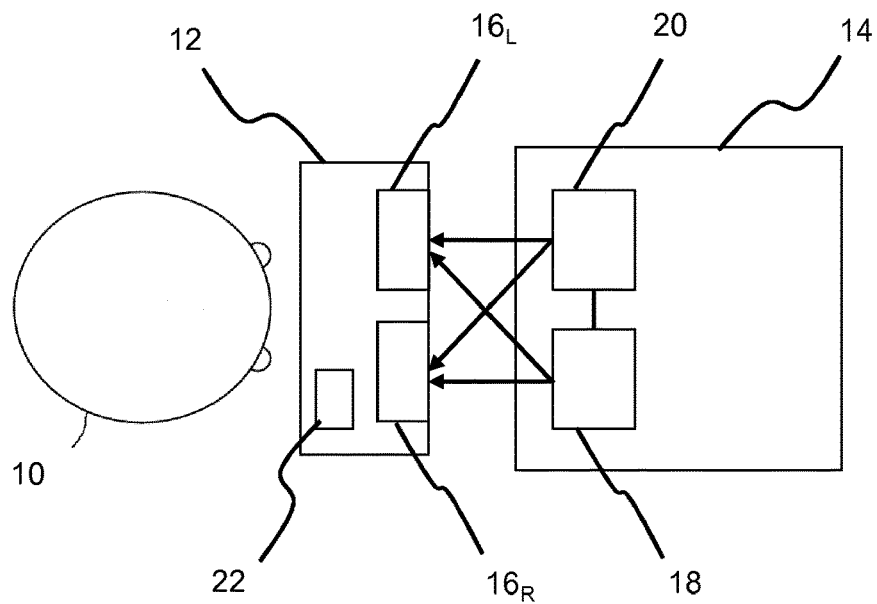
Figure 1
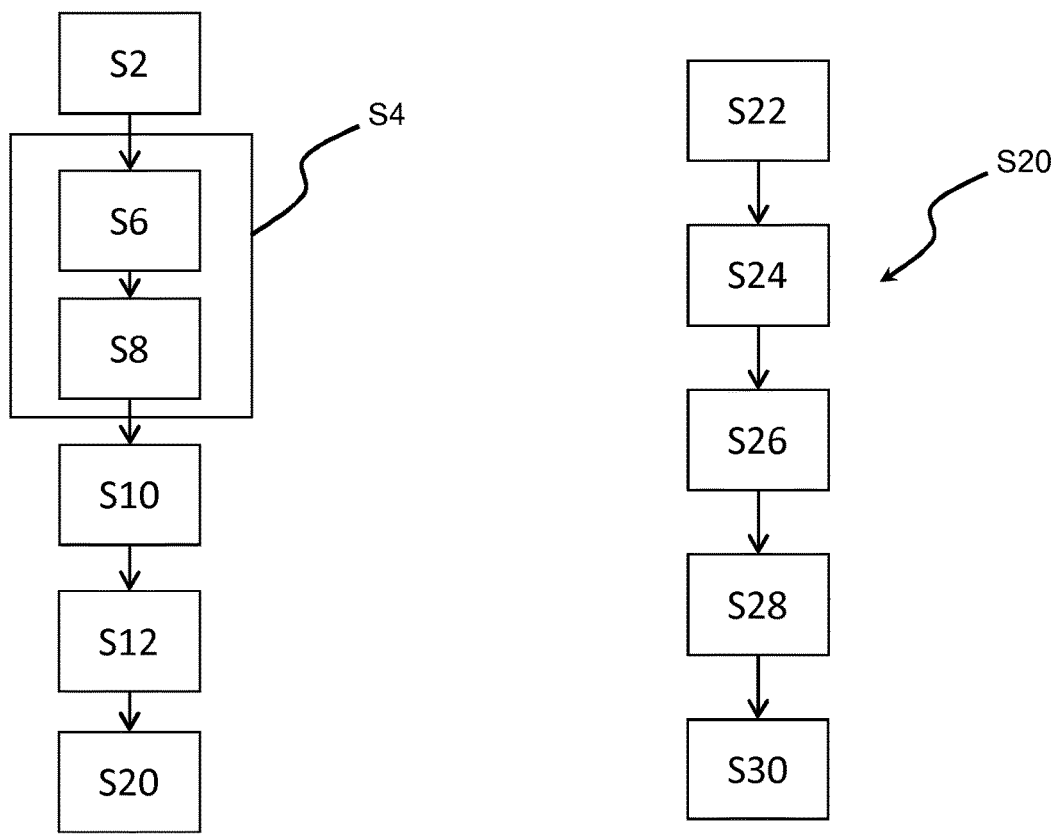
Figure 2                    Figure 4

METHOD FOR CALIBRATING A BINOCULAR DISPLAYING DEVICE

The invention relates to a calibrating system and a calibrating method for calibrating the position of pictures on display elements of a binocular displaying device.

A binocular displaying device comprises a right display element and a left display element, respectively designed to be placed in front of a corresponding eye of a wearer, and to display right and left pictures.

Such a binocular displaying device is generally designed for an average wearer. As a result, it may present the drawback of not being optimized for the actual wearer. Consequently, it can quickly give rise to the wearer suffering dizziness and nausea.

Indeed, on the contrary of a monocular system for which there are not too many calibration problem for adaptation to the wearer, for a stereoscopic system, the images projected on each eye must be placed in front of the corresponding eye, and thus adapted to the physiology of the wearer.

Setting means may be used to adapt a binocular displaying device to a particular wearer. However, such setting means are fastidious to use.

One object of the invention is to provide calibrating system and method that do not present the drawbacks mentioned hereinabove.

In particular, one object of the invention is to provide calibrating system and method enabling information content to be viewed while limiting visual fatigue and discomfort for the wearer of a binocular displaying device. Moreover, one object of the invention is to provide pictures positioning system and method making the setting easier.

To this end, the invention proposes a calibrating method for calibrating the position of pictures on display elements of a binocular displaying device, the binocular displaying device comprising a right display element and a left display element to display right and left pictures, the method comprising:
- a virtual markers displaying step, during which a right virtual marker and a left virtual marker are displayed respectively from the right display element and the left display element when the wearer uses the binocular displaying device, the right and left virtual markers being at least visually vertically alignable with a real world target at an alignment condition, and
- an aligning step, during which each of the right and left virtual markers are aligned with the real world target.

Advantageously, the method according to the invention, allows to easily calibrate the binocular displaying device to allow a realistic stereoscopic display suitable for the wearer and more particularly thanks to at least one wearer related parameter, for example the position of the wearer's eyes relative to the display elements and/or the interpupillary distance (IPD).

Thus, right and left pictures are simply displayed depending on the wearer so that said wearer views the information content under conditions that are best adapted to the wearer's physiology. Consequently, the physiological fatigue is minimized.

In other words, the method according to the invention allows the buyer of a binocular displaying device to adjust directly and independently the binocular displaying device to adapt the display elements to its physiology.

According to further embodiments which can be considered alone or in combination:
- the binocular displaying device is configured to display right and left pictures at a projection distance and the real world target is localized at sensibly the projection distance;
- the calibrating method further comprises a virtual marker position storing step, during which the position of each of the left and right virtual marker at the alignment condition is stored in a control system embedded in the binocular displaying device;
- the aligning step is performed manually;
- each of the right and left virtual markers comprises at least a vertical line;
- the calibrating method further comprises a user input receiving step, during which a user input indicating when the left and/or the right virtual marker is visually aligned with the real world target at the alignment condition is received;
- the steps of the method of claim 1 are executed by a processor a plurality of times;
- the aligning step comprises:
  - a first aligning step, during which one of the right and left virtual markers is aligned with the real world target, and
  - a second aligning step, during which the other of the right and left virtual markers is aligned with the real world target while maintaining the one of the right and left virtual markers aligned with the real world target;
- the calibrating method further comprises an interpupillary distance determining step, during which the interpupillary distance is determined;
- the interpupillary distance determining step comprises:
  - a real pattern displaying step, during which a real pattern is displayed on a screen or printed on a sheet of paper, the real pattern comprising at least a real left vertical line, a real right vertical line,
  - a virtual pattern displaying step, during which a virtual pattern is displayed on the right and on the left display elements, the virtual pattern being visually alignable with the real pattern at an alignment condition, the virtual pattern comprising at least a virtual left cursor, a virtual right cursor,
  - a cursors aligning step, during which for each of the right and left display elements, the virtual right cursor and then the virtual left cursor are aligned respectively with the real right vertical line and the real left vertical line,
  - a virtual cursors position determining step, during which the position of each of the virtual left and right cursors on the right and left display element at the alignment condition is determined, and
  - an interpupillary distance calculating step, during which the interpupillary distance is calculated based on the determined positions of each of the virtual left and right cursors on the right and left display element at the alignment condition;
- the real world target is a background object in the environment of the wearer, the real world target having a vertical linear component.

According to a further aspect, the invention relates to a computer program product comprising one or more stored sequences of instructions that are accessible to a processor and which, when executed by the processor, causes the processor to carry out the steps of a calibrating method according to the invention.

The invention further relates to a computer readable medium carrying one or more sequences of instructions of the computer program product according to the invention.

Furthermore, the invention relates to a program which makes a computer execute the method of the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or a Field Programmable Gate Array ("FPGA") or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The invention also relates to a calibrating system for calibrating the position of pictures on display elements of a binocular displaying device, the binocular displaying device comprising a right display element and a left display element to display right and left pictures, the calibration system comprising:

virtual markers displaying means configured to display a right virtual marker and a left virtual marker respectively from the right display element and the left display element when the wearer used the binocular displaying device, the right and left virtual markers being at least visually vertically alignable with a real world target at an alignment condition, and markers moving means configured to move at least horizontally each of the right and left virtual markers respectively on the right and on the left display elements.

According to a further aspect, the invention relates to a binocular displaying system comprising:

a binocular displaying device comprising a right display element and a left display element to display right and left pictures, and a calibrating system configured to:
generate a right and a left pictures to be displayed respectively on the right and the left display element, the right and the left pictures comprising respectively a right virtual marker and a left virtual marker, move at least horizontally each of the right and left virtual markers respectively on the right and on the left display elements.

According to further embodiments which can be considered alone or in combination:

the calibrating system is embedded in the binocular displaying device.

the calibrating system is embedded in a distant unity.

Figure 3B:
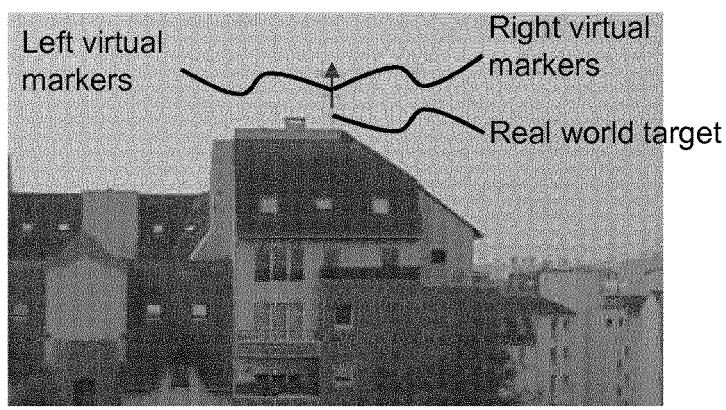
Figure 5:
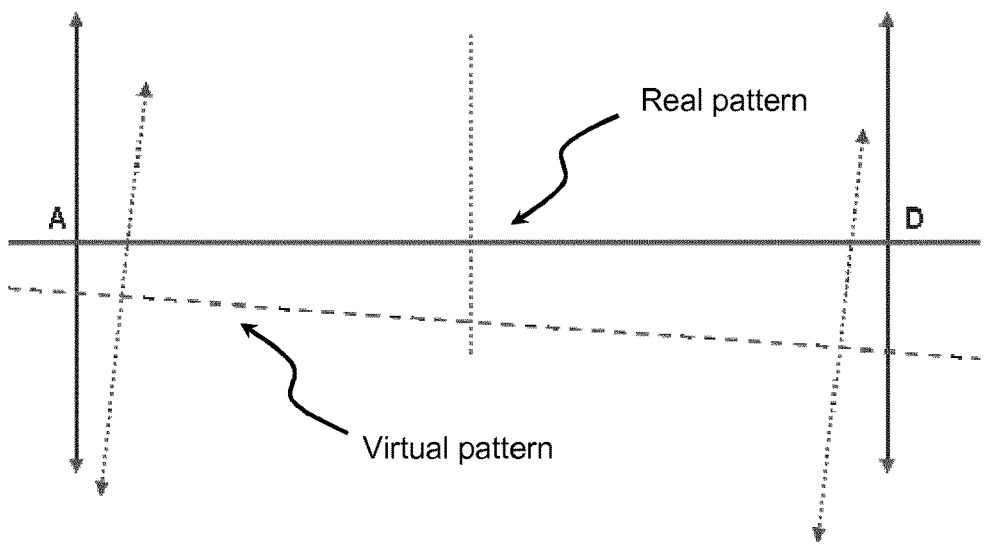

Other features and advantages of the present invention will become apparent from the following description of non-limitative embodiments, with reference to the attached drawing in which:

FIG. 1 is a schematic block diagram representing a wearer, a binocular displaying device, and a calibrating system according to some embodiments of the invention, FIG. 2 is a flow chart showing steps of a calibrating method according to some embodiments of the invention, FIGS. 3A and 3B illustrates the image seen through the see-through displays before and after adjustment step according to the invention, FIG. 4 is a flow chart showing an optional step of a calibrating method according to some embodiments of the invention, and FIG. 5 illustrates an example of a real pattern and a virtual pattern which can be used during the method according to the invention.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

The invention relates to a calibrating method for calibrating the position of pictures on display elements of a binocular displaying device.

FIG. 1 represents a wearer 10, a binocular displaying device 12, and a calibrating system 14 according to some embodiments of the invention.

The binocular displaying device 12 represented on FIG. 1 comprises a right display element $16_R$ and a left display element $16_L$ to display right and left pictures. a right display element $16_R$ and a left display element $16_L$ are preferably respectively designed to be placed in front of a corresponding eye of a wearer 10. For instance, the right and left pictures are right and left stereoscopic pictures. Alternatively, the right and left pictures may be two identical pictures.

The right and left display elements $16_R$, $16_L$ may be display screens, for example LCD (liquid crystal display) screens. The display screens may be opaque screens or see-thru screens. More generally, the right and left display elements $16_R$, $16_L$ may be any type of display elements. The display elements can also be placed in a different position, and a projection system can send the images to the wearer eyes. Projection systems can be semi reflective mirror, light guide or any other image transmission system.

The calibrating system 14 may be embedded in the binocular displaying device 12, or may be a distant entity configured to communicate with the binocular displaying device 12.

The calibrating system 14 is configured to generate a right and a left pictures to be displayed respectively on the right and the left display element such that the right and the left pictures comprising respectively a right virtual marker and a left virtual marker.

To this end, the calibrating system 14 comprises virtual markers displaying means 18 configured to display a right virtual marker and a left virtual marker respectively from the right display element $16_R$ and the left display element $16_L$ when the wearer used the binocular displaying device. The right and left virtual markers are at least visually vertically alignable with a real world target at an alignment condition.

Furthermore, the calibrating system 14 comprises markers moving means 20 configured to move at least horizontally each of the right and left virtual markers respectively on the right and on the left display elements $16_R$, $16_L$.

Thus, the calibrating system 14 is configured to move at least horizontally each of the right and left virtual markers respectively on the right and on the left display elements $16_R$, $16_L$.

Preferably, the binocular displaying device 12 is configured to display right and left pictures at a projection distance and the real world target is localized at sensibly the projection distance.

Advantageously, the real world target is a background object in the environment of the wearer, the real world target having a vertical linear component, for example a vertical edge of a building.

The calibrating system according to the invention is adapted and configured to implement the calibrating method according to some embodiments of the invention.

The calibrating method according to the invention will now be detailed.

Referring to FIG. 2, we are describing below a calibrating method according to an example embodiment of the invention. The calibrating method comprises at least:
    a virtual markers displaying step S2, and
    an aligning step S4.

During the virtual markers displaying step S2, a right virtual marker and a left virtual marker are displayed respectively from the right display element $16_R$ and the left display element $16_L$ when the wearer uses the binocular displaying device 12.

The right and left virtual markers are at least visually vertically alignable with a real world target at an alignment condition. Preferably, each of the right and left virtual markers comprises at least a vertical line. For example, the virtual markers are vertical arrows as represented on FIG. 3A which illustrates the virtual markers superimposed on a real world scene.

The real world target may be a vertical edge of a building, for example localized at a far distance from the wearer in the real scene.

Then, during the aligning step S4 each of the right and left virtual markers are aligned with the real world target. During the alignment step, the virtual markers right and left are superimposed.

First, one of the right and left virtual markers is aligned with the real world target during a first aligning step S6. Then, the other of the right and left virtual markers is aligned with the real world target while maintaining the one of the right and left virtual markers aligned with the real world target during a second aligning step S8.

FIG. 3B illustrates the same real-world scene with both virtual markers aligned with a vertical antenna forming the real world target.

Preferably, the aligning step is performed manually by the wearer of the binocular displaying device 12.

For example, a vertical edge of a building is chosen to be the real world target which will be used for the calibration. The real world target is chosen at a defined distance with a comfortable head position in the middle of the field of view. Then, while the right eye is closed, the user aligns manually a left vertical arrow, forming the left virtual marker, displayed by the left display element, with the vertical edge of the building. Then, while both eyes are open, the user aligns manually a right vertical arrow, forming the right virtual marker, displayed by the right display element, with the same vertical edge of the building while maintaining the alignment between the left vertical arrow and the vertical edge of the building.

The method according to the invention allows to simply align the display elements 16 on the center of the eyes and to superimpose vertical lines forming virtual markers on the display element of each eye to a vertical line of a far object, forming the real world target, for example a vertical edge of a building or to a vertical line of an intermediate object, for example a vertical edge of a wall in the room where the user is.

Furthermore, the calibrating method can comprise a user input receiving step S10. During this step S10, a user input is received which indicates when the left and/or the right virtual marker is visually aligned with the real world target at the alignment condition.

This user input allows to validate alignment, for example by touch control (for example a button) on frames of the binocular display element or a mouse click or any other interface of a remote device connected to the binocular display element, with wires or wireless, in the case wherein the binocular display element is configured to communicate with such a remote device during the implementation of the calibration method.

Once this alignment validated, the positions of the virtual markers can be stored.

To this end, the calibrating method comprises advantageously a virtual marker position storing step S12. During this step S12, the position of each of the left and right virtual marker at the alignment condition is stored in a control system 22 embedded in the binocular displaying device 12.

Of course, the steps of the method are preferably executed by a processor a plurality of times.

In addition, to ensure that the wearer looks in the middle of the field of view, the virtual markers displayed on each eye can be moved together, so as to remain central in relation to a starting position set during manufacturing binocular displaying device, which ensures that the left and right display elements are equidistant from the nose. This method makes it possible to fix the origin of the two display elements, from which other complementary measures can be made.

As the distance of the display elements during the manufacture and size of the displayed pixels are known, one could deduce the interpupillary distance, but an interpupillary distance determining step according to the invention provides better results.

Indeed, the calibrating method advantageously comprises an interpupillary distance determining step S20, during which the interpupillary distance (IPD) is determined. The interpupillary distance is defined in the standard ISO 13666: 1998.

The interpupillary distance determining step S20, with reference to FIG. 4, comprises:
a real pattern displaying step S22,
a virtual pattern displaying step S24,
a cursors aligning step S26,
a virtual cursors position determining step S28, and
an interpupillary distance calculating step S30.

During the real pattern displaying step S22, a real pattern is displayed on a screen or printed on a sheet of paper, the real pattern comprising at least a real left vertical line, a real right vertical line. Advantageously, the size of a real pattern printed on a sheet of paper is known exactly. An object whose shape and size is calibrated and well-identifiable in order to align cursors with it may also be used.

A virtual pattern is displayed on the right and on the left display elements during the virtual pattern displaying step S24. The virtual pattern is visually alignable with the real pattern at an alignment condition. Furthermore, the virtual pattern comprises at least a virtual left cursor and a virtual right cursor.

FIG. 5 illustrates an example of such a real pattern and such a virtual pattern.

Then, during the cursors aligning step S26, for the right display element, the virtual right cursor and then the virtual left cursor are aligned respectively with the real right vertical line and the real left vertical line. Then, for the left display elements, the virtual right cursor and then the virtual left cursor are also aligned respectively with the real right vertical line and the real left vertical line.

The position of each of the virtual left and right cursors on the right and left display elements at the alignment condition is determined during the virtual cursors position determining step S28.

Finally, the interpupillary distance is calculated based on the determined positions of each of the virtual left and right cursors on the right and left display element at the alignment condition during the interpupillary distance calculating step S30.

An advantage of this interpupillary distance determining step is that it does not use camera unlike the usual methods for determining the IPD. Furthermore, the IPD value is determined absolutely.

Thanks to the invention, a buyer of a binocular displaying device can adjust easily, directly and independently the binocular displaying device to adapt the display elements to its physiology. Thus he can obtain a realistic stereoscopic display suitable for the wearer. Consequently, the physiological fatigue is minimized.

Furthermore, the calibration method according to the invention can be implemented by an optician in the case wherein the optician sells the binocular displaying device. In this case, a test bench may allow more accurate measurements of the IPD and ensure that the wearer's head does not move during measurements.

To implement the calibration according the invention, a dedicated computer program product is necessary, which comprises stored sequences of instructions that are accessible to a processor, and which when executed by the processor causes the processor to carry out the steps of the calibrating method according the invention.

This dedicated computer program product can be permanently stored in the binocular display system or in a remote entity which can communicate with the binocular display system, and can be executed by a particular action, for example an action of the wearer.

Moreover, the calibration data of a user of the binocular display system comprising at least the position of the virtual marker at the alignment condition, are stored in a control system embedded in the binocular display system or in a remote entity which can communicate with the binocular display system. Of course, it is possible to store several calibration data for different users of same binocular display system.

The invention has been described above with the aid of embodiments without limitation of the general inventive concept as defined in the claims.

Many modifications and variations will suggest themselves to those skilled in the art upon making reference to the foregoing illustrative embodiments, which are given by way of example only and which are not intended to limit the scope of the invention, that being determined solely by the appended claims.

Indeed, several sensors embedded or not in the binocular display system according to the invention may be used in order to increase accuracy and reduce the risk of measurement error. For example, if the binocular display system comprises a position sensor and/or an inclination sensor, it is possible to verify that the wearer's head is well positioned to display vertical virtual markers, and possibly to compensate for mounting defects of the display elements.

The invention claimed is:

1. A calibrating method for calibrating a position of pictures on display elements of a binocular displaying device, the binocular displaying device comprising a right display element and a left display element, to display right and left pictures, the method comprising:
displaying a right virtual marker and a left virtual marker respectively from the right display element and the left display element when a wearer uses the binocular displaying device, the right and left virtual markers being visually vertically alignable with a real world target having a vertical linear component, at an alignment condition, the right virtual marker, the left virtual marker and the real world target being at a same depth relative to the wearer's eyes; and
aligning each of the right and left virtual markers with the real world target having the vertical linear component by moving the right and left virtual markers with respect to the real world target at the said same depth, the real world target being a background object in an environment of the wearer, and each of the right and left virtual markers being a vertical bar, wherein
the aligning comprises
aligning one of the right and left virtual markers with the real world target while a corresponding eye is open, and
while both eyes are open, aligning the other of the right and left virtual markers with the real world target while maintaining the one of the right and left virtual markers aligned with the real world target.

2. The calibrating method according to claim 1, wherein the binocular displaying device is configured to display right and left pictures at a projection distance and the real world target is localized at the projection distance.

3. The calibrating method according to claim 1, further comprising storing a position of each of the left and right virtual markers at the alignment condition in a control system embedded in the binocular displaying device.

4. The calibrating method according to claim 1, wherein the aligning is performed manually.

5. The calibrating method according to claim 1, further comprising receiving a user input indicating when the left and/or the right virtual marker is visually aligned with the real world target at the alignment condition.

6. The calibrating method according to claim 1, wherein the displaying and the aligning are executed by a processor a plurality of times.

7. The calibrating method according to claim 1, further comprising determining an interpupillary distance.

8. The calibrating method according to claim 7, wherein the determining comprises:
displaying a real pattern on a screen or printed on a sheet of paper, the real pattern comprising at least a real left vertical bar and a real right vertical bar,
displaying a virtual pattern on the right and on the left display elements, the virtual pattern being visually alignable with the real pattern at an alignment condition, the virtual pattern comprising at least a virtual left cursor, a virtual right cursor,
aligning, for each of the right and left display elements, the virtual right cursor and then the virtual left cursor respectively with the real right vertical bar and the real left vertical bar,
determining a position of each of the virtual left and right cursors on the right and left display element at the alignment condition is determined, and
calculating the interpupillary distance based on the determined positions of each of the virtual left and right cursors on the right and left display element at the alignment condition.

9. A non-transitory computer readable medium having instructions stored thereon, that are executable by a processor to perform the method of claim 1.

10. A calibrating system for calibrating a position of pictures on display elements of a binocular displaying device, the binocular displaying device comprising a right display element and a left display element to display right and left pictures, the calibration system comprising:
at least one processor configured to
display a right virtual marker and a left virtual marker respectively from the right display element and the left display element when a wearer uses the binocular displaying device, the right and left virtual markers being visually vertically alignable with a real world target having a vertical linear component, at an alignment condition, the right virtual marker, the left virtual marker and the real world target being at a same depth relative to the wearer's eyes, and
move at least horizontally each of the right and left virtual markers respectively on the right and on the left display elements at the said same depth, the real world target being a background object in an environment of the wearer, and each of the right and left virtual markers being a vertical bar, wherein
the at least one processor moves at least horizontally the each of the right and left virtual markers by
aligning one of the right and left virtual markers with the real world target while a corresponding eye is open, and
while both eyes are open, aligning the other of the right and left virtual markers with the real world target while maintaining the one of the right and left virtual markers aligned with the real world target.

11. A binocular displaying system comprising:
a binocular displaying device comprising a right display element and a left display element to display right and left pictures to a wearer of the binocular displaying device; and
a calibrating system configured to:
generate the right and left pictures to be displayed respectively on the right and the left display elements, the right and the left pictures comprising respectively a right virtual marker and a left virtual marker, the right and left virtual markers being visually vertically alignable with a real world target having a vertical linear component, the right virtual marker, the left virtual marker and the real world target being at a same depth relative to the wearer's eyes, and
move at least horizontally each of the right and left virtual markers respectively on the right and on the left display elements at the said same depth, the real world target being a background object in an environment of the wearer, and each of the right and left virtual markers being a vertical bar, wherein
the calibrating system moves at least horizontally the each of the right and left virtual markers by
aligning one of the right and left virtual markers with the real world target while a corresponding eye is open, and
while both eyes are open, aligning the other of the right and left virtual markers with the real world target while maintaining the one of the right and left virtual markers aligned with the real world target.

12. The binocular displaying system according to claim 11, wherein the calibrating system is embedded in the binocular displaying device.

* * * * *